United States Patent
Yu et al.

(10) Patent No.: US 12,159,385 B1
(45) Date of Patent: Dec. 3, 2024

(54) METHOD AND SYSTEM FOR MONITORING AND SAFETY EVALUATION OF DAM BODY DEFECT OF CHECK DAM

(71) Applicants: China Institute of Water Resources and Hydropower Research, Beijing (CN); PowerChina Northwest Engineering Corporation Limited, Beijing (CN)

(72) Inventors: Shu Yu, Beijing (CN); Naichang Zhang, Beijing (CN); Penghai Yin, Beijing (CN); Fan Yue, Beijing (CN); Jianwei Hao, Beijing (CN); Zhaohui Xia, Beijing (CN); Jianqin Wang, Beijing (CN); Yongxiang Cao, Beijing (CN); Zuyu Chen, Beijing (CN); Heng Zhou, Beijing (CN); Ziyu Lv, Beijing (CN); Xiaomei Kou, Beijing (CN)

(73) Assignees: China Institute of Water Resources and Hydropower Research, Beijing (CN); PowerChina Northwest Engineering Corporation Limited, Beijing (CN)

( * ) Notice: Subject to any disclaimer, the term of this patent is extended or adjusted under 35 U.S.C. 154(b) by 0 days.

(21) Appl. No.: 18/741,807

(22) Filed: Jun. 13, 2024

(30) Foreign Application Priority Data

Aug. 18, 2023 (CN) .......................... 202311048486.1

(51) Int. Cl.
*G06T 7/00* (2017.01)
*G06T 17/00* (2006.01)
(Continued)

(52) U.S. Cl.
CPC ............ *G06T 7/0002* (2013.01); *G06T 17/00* (2013.01); *G06V 10/40* (2022.01); *G06V 10/764* (2022.01);
(Continued)

(58) Field of Classification Search
CPC ................... G06T 7/0002; G06T 17/00; G06T 2207/10024; G06T 2207/10032;
(Continued)

(56) References Cited

FOREIGN PATENT DOCUMENTS

| AU | 2021100365 A4 * | 4/2021 |
| CN | 107480341 A | 12/2017 |

(Continued)

OTHER PUBLICATIONS

Ross Girshick, Fast R-CNN, CVF, pp. 1440-1448.
(Continued)

*Primary Examiner* — Samir A Ahmed
(74) *Attorney, Agent, or Firm* — Bayramoglu Law Offices LLC

(57) ABSTRACT

A method for monitoring and safety evaluation of a dam body defect of a check dam is provided, including steps of: obtaining multi-source remote sensing data, unmanned aerial vehicle (UAV) data, ground monitoring data and sensing images through a three-dimensional data network; identifying the sensing images through an R-CNN algorithm and a Fast R-CNN based on the UAV data and check dam body database to determine check dams having defects and types of defects, defect data and position data; performing classification statistics of the check dams having defects according to the types of defects; building a three-dimensional model of the dam body safety evaluation standards for check dams after classification according to the position data and the ground monitoring data; input the defect data in a check dam safety performance evaluation module to obtain
(Continued)

simulation data; and completing the evaluation according to the simulation data and the three-dimensional model.

10 Claims, 2 Drawing Sheets

(51) Int. Cl.
    *G06V 10/40*     (2022.01)
    *G06V 10/764*     (2022.01)
    *G06V 10/766*     (2022.01)
    *G06V 10/82*     (2022.01)
    *G06V 20/13*     (2022.01)
    *G06V 20/50*     (2022.01)

(52) U.S. Cl.
    CPC ............ *G06V 10/766* (2022.01); *G06V 10/82* (2022.01); *G06V 20/13* (2022.01); *G06V 20/50* (2022.01); *G06T 2207/10024* (2013.01); *G06T 2207/10032* (2013.01); *G06T 2207/20084* (2013.01); *G06T 2207/30184* (2013.01)

(58) Field of Classification Search
    CPC ........... G06T 2207/20084; G06T 2207/30184; G06V 10/40; G06V 10/764; G06V 10/766; G06V 10/82; G06V 20/13; G06V 20/50
See application file for complete search history.

(56) References Cited

FOREIGN PATENT DOCUMENTS

| | | | |
|---|---|---|---|
| CN | 112419690 A | | 2/2021 |
| CN | 112750138 A | | 5/2021 |
| CN | 114707227 A | | 7/2022 |
| CN | 115223337 A | | 10/2022 |
| CN | 115909662 A | | 4/2023 |
| CN | 117078627 A | * | 11/2023 |
| KR | 20210115245 A | | 9/2021 |

OTHER PUBLICATIONS

Ross Girshick, et al., Rich feature hierarchies for accurate object detection and semantic segmentation, CVF, pp. 1-8.

Yu Shu, et al., Research and Application of Risk Warning Prevention and Control Platform of Check Dam Systems, Bulletin of Soil and Water Conservation, 2023, pp. 84-91, vol. 43 No. 1.

Sun Liquan, et al., Check dam extraction from remote sensing images using deep learning and geospatial analysis: A case study in the Yanhe River Basin of the Loess Plateau, China, J Arid Land, 2023, pp. 34-51, vol. 15 No. 1.

Ximing Zhang, et al., Proposal-Based Visual Tracking Using Spatial Cascaded Transformed Region Proposal Network, Sensors, 2020, pp. 1-20, vol. 20, 4810.

* cited by examiner

METHOD AND SYSTEM FOR MONITORING AND SAFETY EVALUATION OF DAM BODY DEFECT OF CHECK DAM

CROSS REFERENCE TO THE RELATED APPLICATIONS

This application is based upon and claims priority to Chinese Patent Application No. 202311048486.1, filed on Aug. 18, 2023, the entire contents of which are incorporated herein by reference.

TECHNICAL FIELD

The present disclosure relates to the technical field of dam body monitoring and safety evaluation, and particularly relates to a method and system for monitoring and safety evaluation of a dam body defect of a check dam.

BACKGROUND

Check dams are one of the important water conservancy projects in the Loess Plateau of China. By the end of November 2019, a total of 58,776 check dams have been built in the Loess Plateau of China. Studies have indicated that the check dams played an extremely important role in flood regulation and silt blocking, silting land for farmland, water and soil conservation, ecological environment improvement, and the like. However, since most of the check dams started to be built from the early 1990s to the beginning of this century, they have some defects in design and construction, and have suffered some damages to varying degrees after a long period of operation, making them impossible to timely and effectively exert the benefits to the greatest extent. In addition, many factors, such as affected by climate warming, El Niño and La Niña phenomena, increasingly frequent extreme rainfall featuring long duration or short-duration heavy rainfall, pose a considerable threat to safe operation of the check dams, as well as the safety of lives and properties of people downstream.

However, up to now, traditional methods for monitoring and evaluation of defects in the check dams are mostly based on manual field monitoring and evaluation, which have the problems of small monitoring range and low precision, poor evaluation accuracy, and the like, of dam body defects for the check dams.

SUMMARY

Aiming at the defects in the prior art, the present disclosure provides a method and system for monitoring and safety evaluation of a dam body defect of a check dam, solving the problems of small monitoring range and low precision, and poor evaluation accuracy in the prior art.

In order to achieve the objective described above, the present disclosure provides the technical solution as follows:

a method for monitoring and safety evaluation of a dam body defect of a check dam, including the following steps:

S1. obtaining long-time-series multi-source remote sensing data, multi-source unmanned aerial vehicle (UAV) data and ground monitoring data through a three-dimensional data network; and processing the long-time-series multi-source remote sensing data to obtain Gaofen-2 satellite (GF-2) high-resolution remote sensing images;

S2. inputting the GF-2 high-resolution remote sensing images to a check dam body defect identification and monitoring module based on the multi-source UAV data, a check dam body feature dataset and a check dam body defect feature dataset to obtain images of all check dams through a Region-based Convolutional Network method (R-CNN) algorithm; and identifying the images of all check dams through a Fast R-CNN algorithm to determine check dams having defects and types of defects, obtaining corresponding defect data, and recording position data of the defects;

S3. performing classification statistics of the check dams having defects according to the types of defects to obtain the check dams after classification;

S4. performing three-dimensional modeling of the check dams after classification according to the position data and the ground monitoring data to obtain a corresponding three-dimensional model, and performing monitoring in real time;

S5. inputting the above defect data to a check dam safety performance evaluation module for simulation according to dam body safety evaluation standards for the check dams, and obtaining corresponding simulation data; and S6. evaluating the check dams having defects according to the simulation data and the three-dimensional model, and completing the evaluation.

Further, in S1, the long-time-series multi-source remote sensing data are processed using radiometric calibration, atmospheric correction, orthorectification and image fusion.

Further, the identification in S2 involves: the GF-2 high-resolution remote sensing images are processed using an region proposal network (RPN) to obtain a set of original targets as proposal targets of the check dams; the proposal targets of the check dams are adjusted using a spatial transformer network (STN) to obtain adjusted proposal targets of the check dams; the adjusted proposal targets of the check dams are inputted to a convolutional neural network (CNN) and a support vector machine (SVM) classifier to obtain the check dams having defects, which corresponds to the following formula:

$$L(\{P_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*)$$

where i represents index of a target region, $\{P_i\}$ represents output of a classification layer, $\{t_i\}$ represents output of a bounding-box regression layer, $L(\{P_i\}, \{t_i\})$ represents a prediction target loss function, $N_{cls}$ represents a classification layer normalization parameter, $N_{reg}$ represents a correction layer normalization parameter, $P_i$ represents a prediction probability that the target region i is a foreground target, $P_i^*$ represents a real target region label, $\lambda$ represents a balance coefficient, $$\sum_i L_{cls}(p_i, p_i^*)$$

represents an error between a classification confidence and a real category, $L_{reg}(t_i, t_i^*)$ represents a translation scaling parameter error between a real target region and a prediction proposal interval, $t_i$ represents four parameter coordinate vectors of a proposal region, and $t_i^*$ represents a coordinate vector of the real target region.

Further, the dam body safety evaluation standards for the check dams in S5 are as follows:
- when a dam body of a check dam has a defect of landslide or overtopping, the defect of landslide can be divided into three levels, that is, "red", "orange" and "blue" according to damage to integrity of the dam body, where "red" indicates that the check dam can operate normally, "orange" indicates that the check dam operates at a low load under field monitoring conditions, and "blue" indicates that the check dam can operate at a medium-to-low load in a short period of time; and
- When the dam body of the check dam has a defect of a hole or an outburst, it is determined that the check dam is marked as an unusable dam, without any emergency flood resistance capability.

The present disclosure further provides a system, including a three-dimensional data network, a check dam body database, a check dam body defect identification module, a check dam body defect monitoring module and a check dam safety performance evaluation module;
- the three-dimensional data network is configured to obtain long-time-series multi-source remote sensing data, multi-source unmanned aerial vehicle (UAV) data and ground monitoring data;
- the check dam body database is configured to construct a check dam body feature dataset and a check dam body defect feature dataset;
- the check dam body defect identification module is configured to obtain images of all check dams through an R-CNN algorithm according to GF-2 high-resolution remote sensing images; and identify the images of all check dams through a Fast R-CNN algorithm to determine check dams having defects and types of defects, obtain corresponding defect data, and record position data of the defects;
- the check dam body defect monitoring module is configured to perform classification statistics of the check dams having defects according to the types of defects to obtain check dams after classification; and perform three-dimensional modeling of the check dams after classification according to the position data and the ground monitoring data to obtain a corresponding three-dimensional model, and perform monitoring in real time; and
- the check dam safety performance evaluation module is configured to input the defect data for simulation according to the dam body safety evaluation standards for the check dams;
- and evaluate the check dams having defects according to the simulation data and the three-dimensional model, and complete the evaluation.

Further, the three-dimensional data network includes satellites, multi-functional unmanned aerial vehicles, and ground monitoring data.

Further, the check dam body defect feature dataset includes a dataset of dam body defect samples, such as deformation, displacement, collapse, hole penetration, crumbling and landslide.

Further, the check dam safety performance evaluation module includes a water conservancy model; and the water conservancy model is a check dam defect analysis model, a check dam outburst flood analysis model or a flood routing model.

The present disclosure has the following beneficial effects: the GF-2 high-resolution remote sensing images are processed through the R-CNN algorithm and the Fast R-CNN algorithm, such that all-weather, high-precision and large-range monitoring of a check dam group can be achieved; and the evaluation accuracy of the check dams is improved through the three-dimensional model, in conjunction with cooperative and comprehensive analysis, built based on the water conservancy model, the long-time-series multi-source remote sensing data, the multi-source unmanned aerial vehicle data and the ground monitoring data.

DETAILED DESCRIPTIONS OF THE EMBODIMENTS

The specific embodiments of the present disclosure are described below to facilitate the understanding of the present disclosure by those skilled in the art. However, it should be clear that the present disclosure is not limited to the scope of the specific embodiments, and various modifications within the spirit and scope of the present disclosure defined and determined by the appended claims would be obvious to those ordinarily skilled, and all inventions created by using concepts of the present disclosure shall fall within the scope of protection of the present disclosure.

Figure 1:
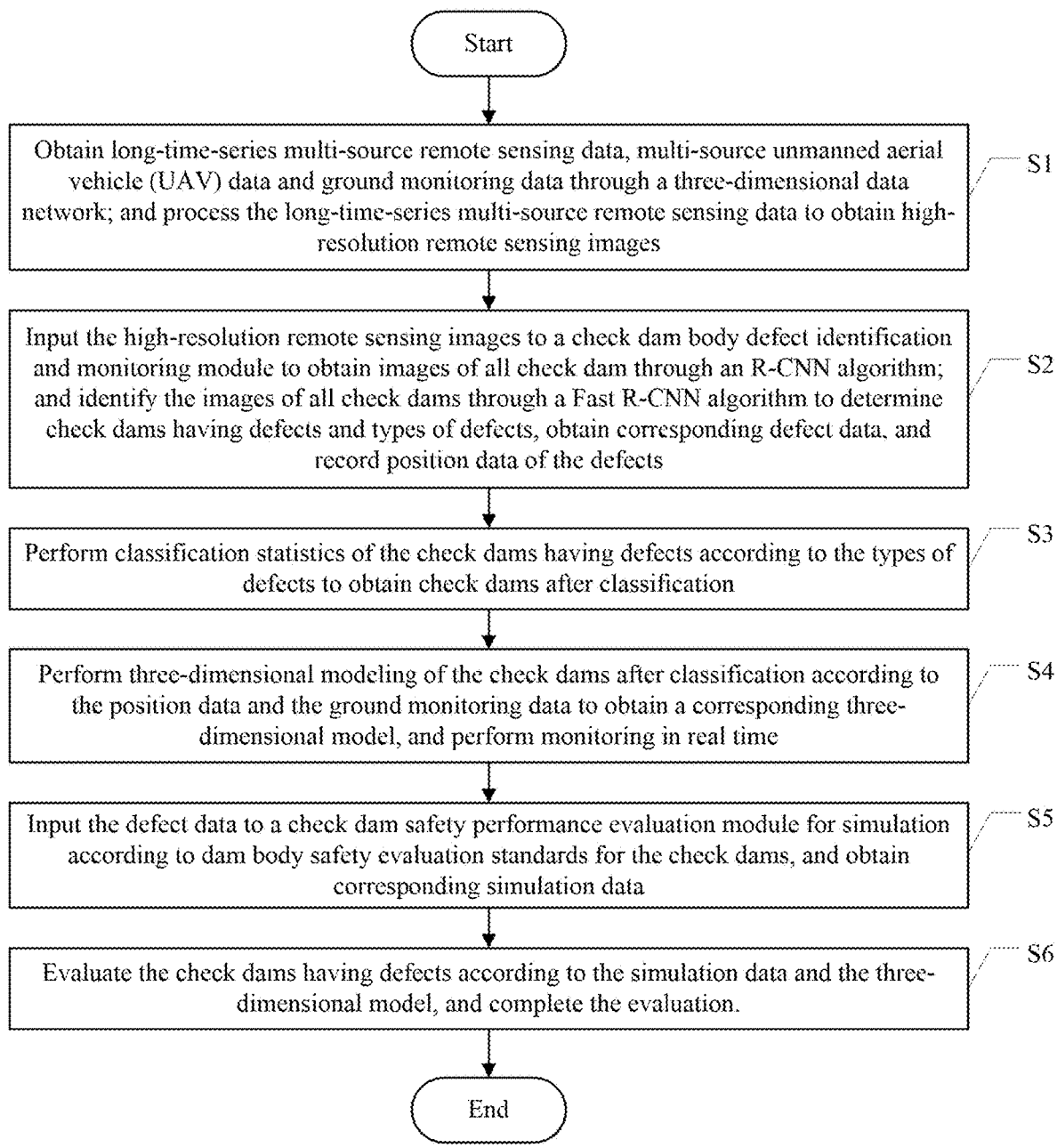
FIG. 1 is a specific flow diagram of the present disclosure.

As shown in FIG. 1, a method for monitoring and safety evaluation of a dam body defect of a check dam includes the following steps:
- S1. obtain long-time-series multi-source remote sensing data, multi-source unmanned aerial vehicle (UAV) data and ground monitoring data through a three-dimensional data network; and process the long-time-series multi-source remote sensing data to obtain Gaofen-2 satellite (GF-2) high-resolution remote sensing images;
- S2. input the GF-2 high-resolution remote sensing images to a check dam body defect identification and monitoring module based on the multi-source UAV data, a check dam body feature dataset and a check dam body defect feature dataset to obtain images of all check dam through an R-CNN algorithm; and identify the images of all check dams through a Fast R-CNN algorithm to determine check dams having defects and types of defects, obtain corresponding defect data, and record position data of the defects;
- S3. perform classification statistics of the check dams having defects according to the types of defects to obtain check dams after classification;
- S4. perform three-dimensional modeling of the check dams after classification according to the position data and the ground monitoring data to obtain a corresponding three-dimensional model, and perform monitoring in real time;
- S5. input the above defect data to a check dam safety performance evaluation module for simulation according to dam body safety evaluation standards for the check dams, and obtain corresponding simulation data; and
- S6. evaluate the check dams having defects according to the simulation data and the three-dimensional model, and complete the evaluation.

In S1, the long-time-series multi-source remote sensing data are processed using radiometric calibration, atmospheric correction, orthorectification and image fusion.

The identification in S2 involves: the GF-2 high-resolution remote sensing images are processed using an region proposal network (RPN) to obtain a set of original targets as proposal targets of the check dams; the proposal targets of the check dams are adjusted using a spatial transformer network (STN) to obtain adjusted proposal targets of the check dams; the adjusted proposal targets of the check dams are inputted to a convolutional neural network (CNN) and a support vector machine (SVM) classifier to obtain the check dams having defects, which corresponds to the following formula:

$$L(\{P_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*)$$

where i represents index of a target region, $\{P_i\}$ represents output of a classification layer, $\{t_i\}$ represents output of a bounding-box regression layer, $L(\{P_i\}, \{t_i\})$ represents a prediction target loss function, $N_{cls}$ represents a classification layer normalization parameter, $N_{reg}$ represents a correction layer normalization parameter, $P_i$ represents a prediction probability that the target region i is a foreground target, $P_i^*$ represents a real target region label, $\lambda$ represents a balance coefficient, $$\sum_i L_{cls}(p_i, p_i^*)$$

represents an error between a classification confidence and a real category, $L_{reg}(t_i, t_i^*)$ represents a translation scaling parameter error between a real target region and a prediction proposal interval, $t_i$ represents four parameter coordinate vectors of a proposal region, and $t_i^*$ represents a coordinate vector of the real target region.

The dam body safety evaluation standards for the check dams in S5 are as follows:
when a dam body of a check dam has a defect of landslide or overtopping, the defect of landslide can be divided into three levels, that is, "red", "orange" and "blue" according to damage to integrity of the dam body, where "red" indicates that the check dam can operate normally, "orange" indicates that the check dam operates at a low load under field monitoring conditions, and "blue" indicates that the check dam can operate at a medium-to-low load in a short period of time; and
when the dam body of the check dam has a defect of a hole or an outburst, it is determined that the check dam is marked as an unusable dam, without any emergency flood resistance capability.

The present disclosure further provides a system, including a three-dimensional data network, a check dam body database, a check dam body defect identification module, a check dam body defect monitoring module and a check dam safety performance evaluation module;
the three-dimensional data network is configured to obtain long-time-series multi-source remote sensing data, multi-source unmanned aerial vehicle (UAV) data and ground monitoring data;
the check dam body database is configured to construct a check dam body feature dataset and a check dam body defect feature dataset;
the check dam body defect identification module is configured to obtain images of all check dams through an R-CNN algorithm according to GF-2 high-resolution remote sensing images; and identify the images of all check dams through a Fast R-CNN algorithm to determine check dams having defects and types of defects, obtain corresponding defect data, and record position data of the defects;
the check dam body defect monitoring module is configured to perform classification statistics of the check dams having defects according to the types of defects to obtain check dams after classification; and perform three-dimensional modeling of the check dams after classification according to the position data and the ground monitoring data to obtain a corresponding three-dimensional model, and perform monitoring in real time; and
the check dam safety performance evaluation module is configured to input the defect data for simulation according to the dam body safety evaluation standards for the check dams;
and evaluate the check dams having defects according to the simulation data and the three-dimensional model, and complete the evaluation.

The three-dimensional data network includes satellites, multi-functional unmanned aerial vehicles, and ground monitoring data.

The check dam body defect feature dataset includes a dataset of dam body defect samples, such as deformation, displacement, collapse, hole penetration, crumbling and landslide.

The check dam safety performance evaluation module includes a water conservancy model; and the water conservancy model is a check dam defect analysis model, a check dam outburst flood analysis model or a flood routing model.

In an embodiment of the present disclosure, the dam body safety evaluation standards for the check dams involves a process of organizing relevant experts or technicians to analyze and study the high-resolution images of the dam body defects of the check dams, to perform safety evaluation on the flood prevention and storage, and to divide the check dams according to different early warning levels The three-dimensional (3D) model refers to a 3D visual interactive model built for a study region by using the high-resolution remote sensing images, such that a user can gain a understanding of topographic and geomorphological features of the study region more intuitively and conveniently, real-time image data of key check dams can be obtained by using the UAV aerial survey technology, and a 3D visualization model of each key check dam is built, enabling the user to gain a better understanding of the dam bodies of key check dams more quickly. Further, in order to make the related responsible personnel to timely understand the distribution and other information of the check dams and defective check dams in a jurisdiction, the system obtains the corresponding defect data of the check dams having defects and the types of defects, record the position data of the defects, and display the 3D visualization model simultaneously.

Figure 2:
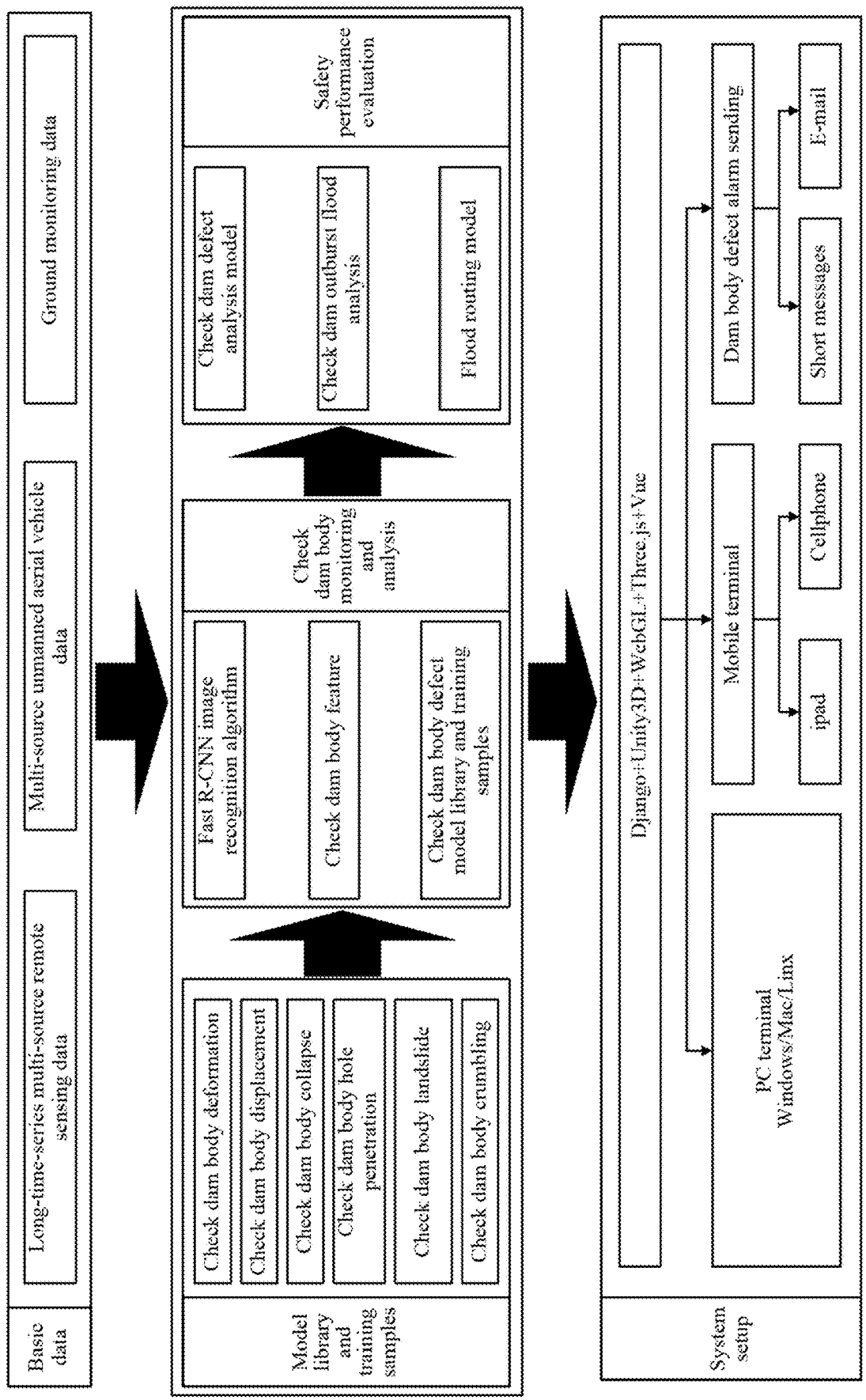
FIG. 2 is a structural diagram of the present disclosure.

As shown in FIG. 2, the system is built based on Django, Unity 3D, WebGL, Three.js and Vue, and further includes a PC terminal, a mobile terminal and a dam body defect alarm sending module, where the PC terminal includes Windows, MAC and Linx operating systems, the mobile terminal includes an ipad and a cellphone, and the dam body defect alarm sending module includes short messages (SMS) and e-mails; and Django is a Web-based application framework, Unity 3D is a 3D graphic development engine, WebGL is a 3D drawing protocol, Three.js is a WebCL engine, and Vue is a JavaScript framework. After evaluation results are obtained, a cross-platform data synchronization application function of the system is fully used to send early warning forecast information to all on-site management personnel and residents downstream of the check dams through the short messages, e-mails and a communication system of the system, so as to ensure that every post and every person are informed of the early warning, the safety the check dams and the people downstream are guarantee, and multi-data monitoring integration, informatization and intelligence of the check dams are implemented, making the management of relevant responsible personnel easier.

In summary, in the present disclosure, the GF-2 high-resolution remote sensing images are processed through the R-CNN algorithm and the Fast R-CNN algorithm, such that all-weather, high-precision and large-range monitoring of a check dam group can be achieved; and the evaluation accuracy of the check dams is improved through the three-dimensional model, in conjunction with cooperative and comprehensive analysis, built based on the water conservancy model, the long-time-series multi-source remote sensing data, the multi-source unmanned aerial vehicle data and the ground monitoring data.

What is claimed is:

1. A method for monitoring and safety evaluation of a dam body defect of a check dam, comprising the following steps:
S1, obtaining long-time-series multi-source remote sensing data, multi-source unmanned aerial vehicle (UAV) data, and ground monitoring data through a three-dimensional data network; and processing the long-time-series multi-source remote sensing data to obtain Gaofen-2 satellite (GF-2) high-resolution remote sensing images;
S2, inputting the GF-2 high-resolution remote sensing images to a check dam body defect identification and monitoring module based on the multi-source UAV data, a check dam body feature dataset, and a check dam body defect feature dataset to obtain images of all check dams through a Region-based Convolutional Network method (R-CNN) algorithm; and identifying the images of all the check dams through a Fast R-CNN algorithm to determine check dams having defects and types of the defects, obtaining corresponding defect data, and recording position data of the defects;
S3, performing classification statistics of the check dams having the defects according to the types of the defects to obtain the check dams after classification;
S4, performing three-dimensional modeling of the check dams after classification according to the position data and the ground monitoring data to obtain a corresponding three-dimensional model, and performing monitoring in real time;
S5, inputting the defect data to a check dam safety performance evaluation module for a simulation according to dam body safety evaluation standards for the check dams, and obtaining corresponding simulation data; and
S6, evaluating the check dams having the defects according to the simulation data and the three-dimensional model, and completing the safety evaluation; wherein
an identification in the S2 comprises: the GF-2 high-resolution remote sensing images are processed using a region proposal network (RPN) to obtain a set of original targets as proposal targets of the check dams; the proposal targets of the check dams are adjusted using a spatial transformer network (STN) to obtain adjusted proposal targets of the check dams; the adjusted proposal targets of the check dams are inputted to a CNN and a support vector machine (SVM) classifier to obtain the check dams having the defects; the identification corresponds to the following formula:

$$L(\{P_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*)$$

in the formula, i represents an index of a target region, $\{P_i\}$ represents an output of a classification layer, $\{t_i\}$ represents an output of a bounding-box regression layer, $L(\{P_i\}, \{t_i\})$ represents a prediction target loss function, $N_{cls}$ represents a classification layer normalization parameter, $N_{reg}$ represents a correction layer normalization parameter, $P_i$ represents a prediction probability that the target region i is a foreground target, $P_i^*$ represents a real target region label, $\lambda$ represents a balance coefficient, $$\sum_i L_{cls}(p_i, p_i^*)$$

represents an error between a classification confidence and a real category, $L_{reg}(t_i, t_i^*)$ represents a translation scaling parameter error between a real target region and a prediction proposal interval, $t_i$ represents four parameter coordinate vectors of a proposal region, and $t_i^*$ represents a coordinate vector of the real target region;
the dam body safety evaluation standards for the check dams in the S5 are as follows:
when a dam body of the check dam suffers a defect of landslide or overtopping, the defect of landslide is allowed to be divided into three levels, wherein the three levels comprises "red", "orange", and "blue" according to damage to integrity of the dam body, wherein "red" indicates that the check dam is allowed to operate normally, "orange" indicates that the check dam operates at a low load under field monitoring conditions, and "blue" indicates that the check dam is allowed to operate at a medium-to-low load in a short period of time; and
when the dam body of the check dam has a defect of a hole or an outburst, the check dam is determined to be marked as an unusable dam, without any emergency flood resistance capability.

2. The method for the monitoring and safety evaluation of the dam body defect of the check dam according to claim 1, wherein in the S1, the long-time-series multi-source remote sensing data are processed using radiometric calibration, atmospheric correction, orthorectification, and image fusion.

3. A system based on the method for the monitoring and safety evaluation of the dam body defect of the check dam according to claim 1, comprising the three-dimensional data network, a check dam body database, a check dam body defect identification module, a check dam body defect monitoring module, and the check dam safety performance evaluation module; wherein
the three-dimensional data network is configured to obtain the long-time-series multi-source remote sensing data, the multi-source UAV data, and the ground monitoring data;
the check dam body database is configured to construct the check dam body feature dataset and the check dam body defect feature dataset;
the check dam body defect identification module is configured to obtain the images of all the check dams through the R-CNN algorithm according to the GF-2 high-resolution remote sensing images; and identify the images of all the check dams through the Fast R-CNN algorithm to determine the check dams having the defects and the types of the defects, obtain the corresponding defect data, and record the position data of the defects;

the check dam body defect monitoring module is configured to perform the classification statistics of the check dams having the defects according to the types of the defects to obtain the check dams after classification; and perform the three-dimensional modeling of the check dams after classification according to the position data and the ground monitoring data to obtain the corresponding three-dimensional model, and perform the monitoring in real time; and the check dam safety performance evaluation module is configured to input the defect data for the simulation according to the dam body safety evaluation standards for the check dams; and evaluate the check dams having the defects according to the simulation data and the three-dimensional model, and complete the safety evaluation.

4. The system according to claim 3, wherein the three-dimensional data network comprises satellites, multi-functional unmanned aerial vehicles, and the ground monitoring data.

5. The system according to claim 3, wherein the check dam body defect feature dataset comprises a dataset of dam body defect samples, comprising deformation, displacement, collapse, hole penetration, crumbling, and the landslide.

6. The system according to claim 3, wherein the check dam safety performance evaluation module comprises a water conservancy model; and the water conservancy model is a check dam defect analysis model, a check dam outburst flood analysis model, or a flood routing model.

7. The system according to claim 3, wherein in the S1 of the method, the long-time-series multi-source remote sensing data are processed using radiometric calibration, atmospheric correction, orthorectification, and image fusion.

8. The system according to claim 7, wherein the three-dimensional data network comprises satellites, multi-functional unmanned aerial vehicles, and the ground monitoring data.

9. The system according to claim 7, wherein the check dam body defect feature dataset comprises a dataset of dam body defect samples, comprising deformation, displacement, collapse, hole penetration, crumbling, and the landslide.

10. The system according to claim 7, wherein the check dam safety performance evaluation module comprises a water conservancy model; and the water conservancy model is a check dam defect analysis model, a check dam outburst flood analysis model, or a flood routing model.

* * * * *